(12) United States Patent
Ridgway et al.

(10) Patent No.: US 8,117,839 B2
(45) Date of Patent: Feb. 21, 2012

(54) PROPANE INJECTION SYSTEM

(75) Inventors: Craig Ridgway, Jet, OK (US); Kevin Kayne, Brown City, MI (US)

(73) Assignee: C & K Prodiesel Development, LLC

( * ) Notice: Subject to any disclaimer, the term of this patent is extended or adjusted under 35 U.S.C. 154(b) by 674 days.

(21) Appl. No.: 12/238,095

(22) Filed: Sep. 25, 2008

(65) Prior Publication Data

US 2010/0071363 A1    Mar. 25, 2010

(51) Int. Cl.
| | |
|---|---|
| F02B 33/44 | (2006.01) |
| F16K 49/00 | (2006.01) |
| F16K 31/12 | (2006.01) |
| F16K 31/36 | (2006.01) |
| F16K 15/00 | (2006.01) |
| F16K 17/00 | (2006.01) |
| F16K 21/04 | (2006.01) |
| E03B 3/18 | (2006.01) |
| E03B 7/07 | (2006.01) |
| F02M 37/22 | (2006.01) |

(52) U.S. Cl. ..... 60/598; 137/340; 137/505; 137/505.11; 137/505.12; 137/549

(58) Field of Classification Search ............. 137/340, 137/505, 505.11, 505.12, 505.18, 505.41, 137/549
See application file for complete search history.

(56) References Cited

U.S. PATENT DOCUMENTS

| | | | |
|---|---|---|---|
| 5,755,254 A * | 5/1998 | Carter et al. | 137/340 |
| 6,073,649 A * | 6/2000 | Somorov | 137/505.41 |
| 6,422,015 B2 * | 7/2002 | Long | 60/605.2 |

\* cited by examiner

*Primary Examiner* — Thomas Denion
*Assistant Examiner* — Michael Carton
(74) *Attorney, Agent, or Firm* — Stetina Brunda Garred & Brucker

(57) ABSTRACT

A flow regulator valve having multiple stages is described herein. The flow regulator valve provides a base amount of propane when the engine is idling and provides additional propane to the engine based on the engine's requirements.

5 Claims, 7 Drawing Sheets

PROPANE INJECTION SYSTEM

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention is related to a flow regulator valve for regulating an amount of gaseous fuel to an air inlet of an engine to improve the fuel efficiency of the engine, reduce emissions of the engine and/or increase power of the engine.

Prior art devices are known to inject propane into an air inlet of a diesel engine. One such system is disclosed in U.S. Pat. No. 4,632,083. Another system is disclosed in U.S. Pat. No. 6,422,015. Unfortunately, these systems do not appear to adequately address efficiency of the engine, reduced emissions and increase power based on the full range of the engine's use.

Accordingly, there is a need in the art for an improved device for regulating an amount of propane or other gaseous fuel dependent upon the full range of the engine's use.

BRIEF SUMMARY

The flow regulator valve disclosed herein addresses the deficiencies noted above, known in the art and discussed below. In an aspect of the flow regulator valve, the same provides a more robust regulation of propane depending on whether the engine is idling, accelerating or being stressed to its maximum limits. In particular, the flow regulator valve provides a base amount of propane to the air inlet of the engine or turbo charger when the engine is idling. When a turbo boost pressure from a turbo charger increases, additional propane is injected into the air inlet to increase power, increase fuel efficiency and/or reduce emissions. As the turbo boost pressure continues to increase, a point of diminishing return is reached wherein the improvements to the engine's performance is less than the cost of propane. At this time, the amount of propane injected into the air inlet is held at a constant.

When the vehicle requires additional power, such as when the vehicle is climbing a hill or pulling a heavy load, the flow regulator valve may introduce additional propane through a third stage to provide such additional power.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
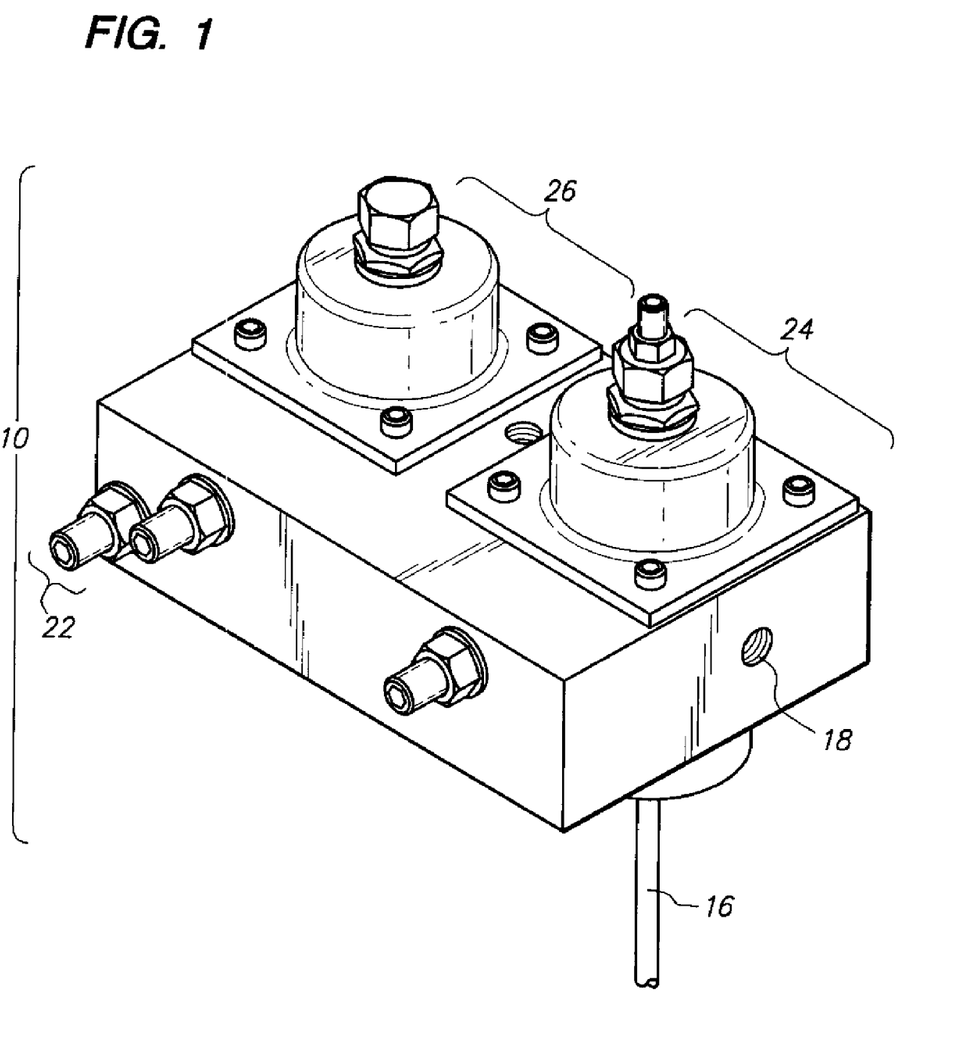
FIG. 1 is a perspective view of a propane injection valve.
Figure 2:
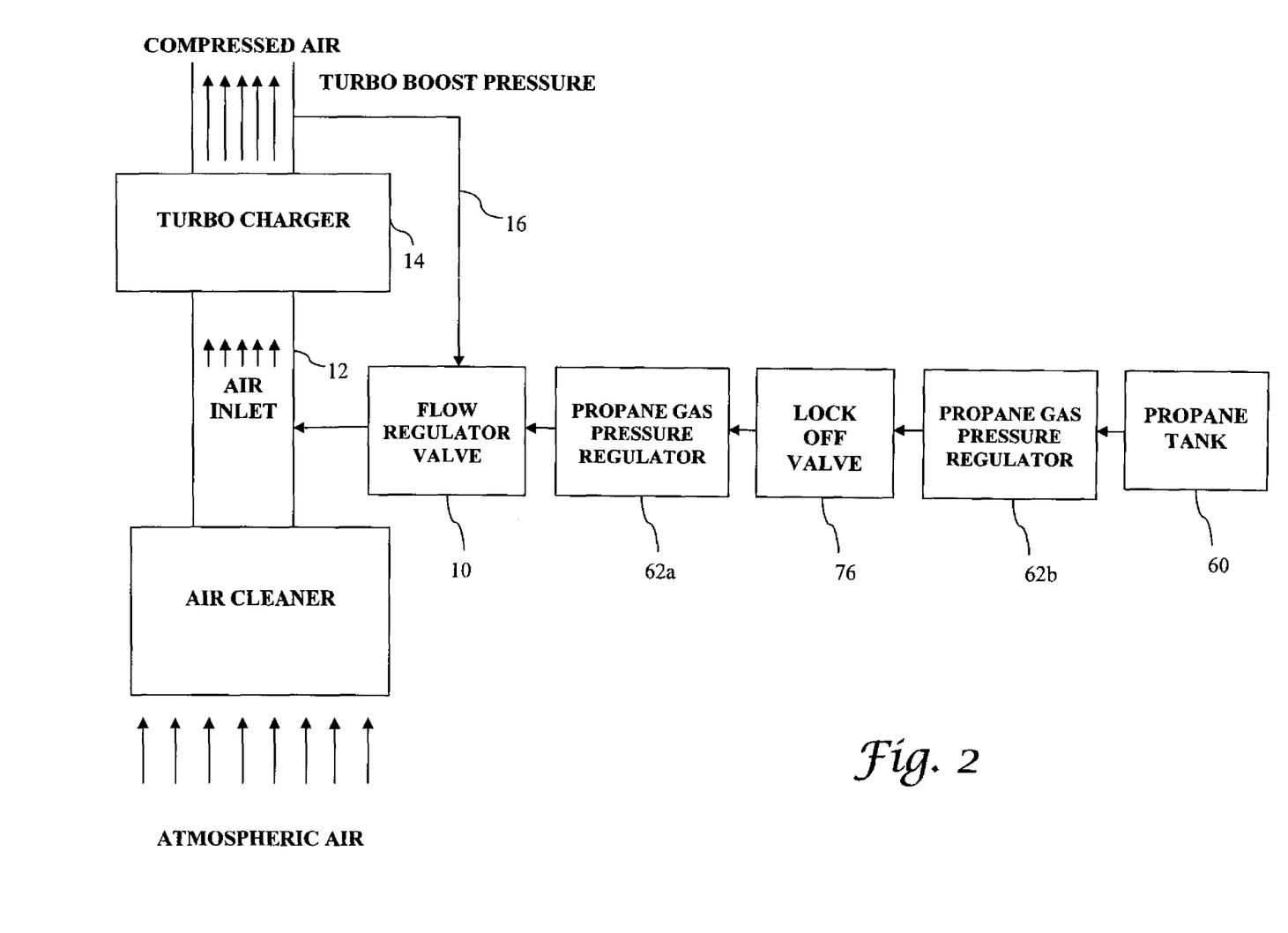
FIG. 2 is a diagram of the propane injection valve with respect to other components of an engine and turbo charger.

Referring now to FIG. 1, a perspective view of a flow regulator valve 10 is shown. As schematically shown in FIG. 2, the flow regulator valve 10 may be installed on an engine with a turbo charger 14 to regulate an amount of propane injected into an air inlet 12 of the turbo charger 14 based upon a turbo boost pressure 16 from the turbo charger 14. The amount of propane injected into the air inlet 12 is regulated to provide optimal fuel efficiency, low emissions and/or power output of the engine.

The propane flows through the flow regulator valve 10 through the propane inlet 18 (see FIG. 1). The boost pressure 16 (see FIG. 2) is sensed by a boost pressure inlet 40 (see FIG. 3). Based on the sensed boost pressure 16, a regulated amount of propane flows through the propane outlets 20a, b and c (see FIG. 3) and flowed into the air inlet 12 (see FIG. 2).

The flow regulator valve 10 shown in FIG. 1 provides propane to the air inlet 12 of the turbo charger 14 in generally three different stages 22, 24 and 26. In use, when the diesel engine is idling, propane does not flow through the second and third stages 24 and 26. When open, these second and third stages 24 and 26 provide propane through propane outlets 20b and c (see FIG. 3). However, when the diesel engine is at idle, propane flows through the propane inlet 18 (see FIG. 1) and out of propane outlet 20a (see FIG. 3). The amount of propane flowing out of propane outlet 20a is constant and regulated by the needle valve 28a. The amount of propane flowing through the first stage 22 is regulated by the needle valve 28a and set to an amount so as to increase the fuel efficiency of the diesel engine and reduce the emissions of the diesel engine when the engine is idling.

As the driver accelerates the diesel engine, the turbo boost pressure 16 increases. At a certain point, the boost pressure 16 opens an orifice 30 (see FIGS. 4 and 5) of the second stage 24 to permit propane to flow into chamber 44 (see FIG. 3A) of the second stage 24 and out of the propane outlet 20b. As the boost pressure increases, a corresponding increase of propane is flowed out of the propane outlet 20b by increasing the orifice size 30. As the boost pressure continues to increase, there is a point of diminishing return wherein the increased fuel efficiency, reduced emissions and/or increased power provides less of a benefit compared to the cost of the propane. At this point, the orifice 30 is limited to a maximum orifice size and cannot be opened anymore.

As the turbo boost pressure 16 continues to increase, a constant amount of propane is injected into the air inlet 12 through the first and second stages 22, 24. When additional power is required, the third stage 26 can be set to provide additional propane to the air inlet 12 to provide such additional power. The third stage 26 does not allow propane to flow therethrough as soon as the orifice 30 of the second stage 24 reaches maximum size. There is a gap. In particular, after the second stage 24 is opened to its maximum amount and the turbo boost pressure 16 increases to a predetermined level, the third stage 26 is opened to permit propane to flow through propane outlet 20c. As the turbo boost pressure 16 increases above the predetermined level after the gap, an increasing amount of propane is injected into the air inlet 12 through the third stage 26. The amount of propane injected into the air inlet 12 via the flow regulator valve 10 is based on the cumulative amount of propane flowing through the propane outlet 20*a*, 20*b* and 20*c*. The maximum amount of propane flowing through the propane outlets 20*b* and *c* can be regulated by needle valves 28*b* and *c*.

Figure 4:
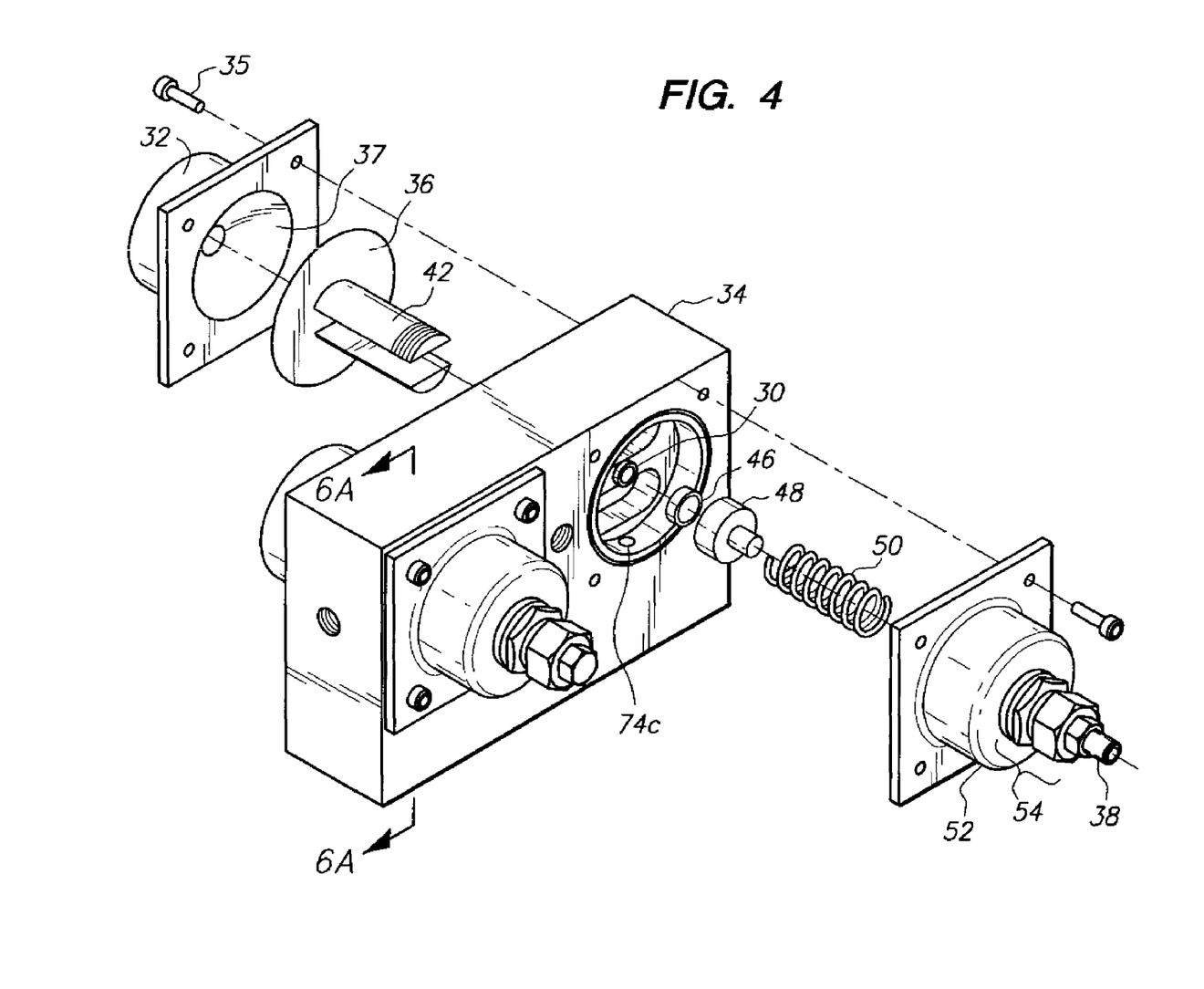
FIG. 4 is a rear exploded perspective view of the valve shown in FIG. 1.
Figure 5:
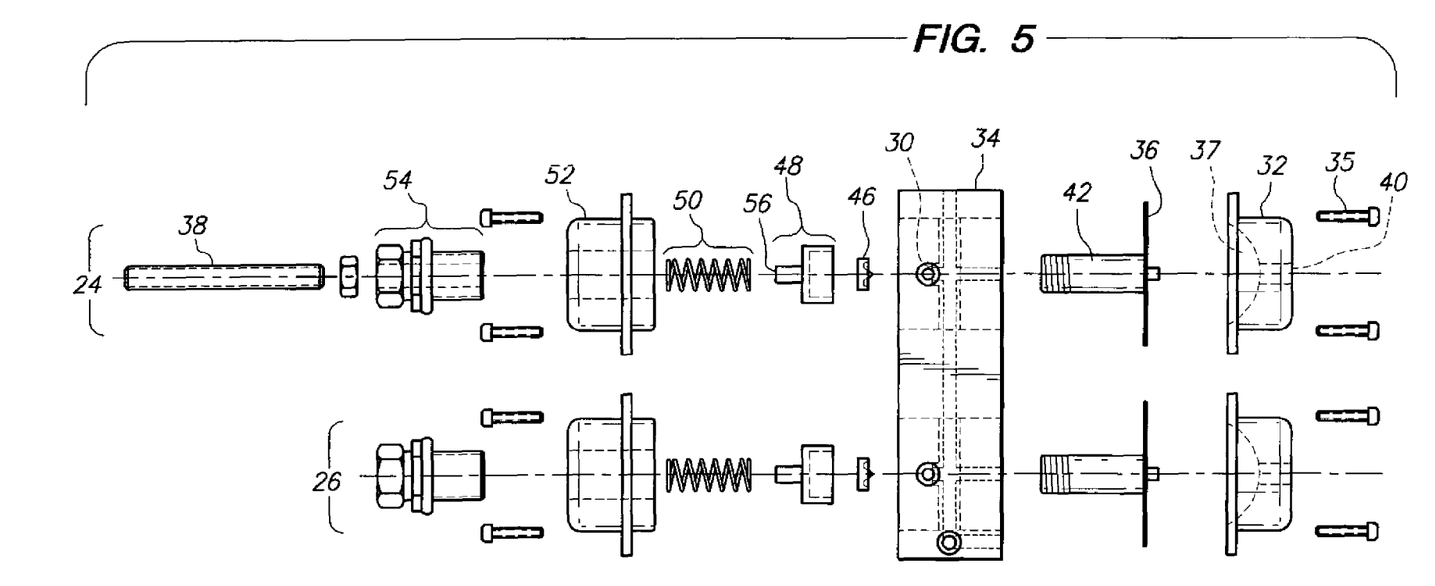
FIG. 5 is an exploded front view of the valve shown in FIG. 1.
Figure 6A:
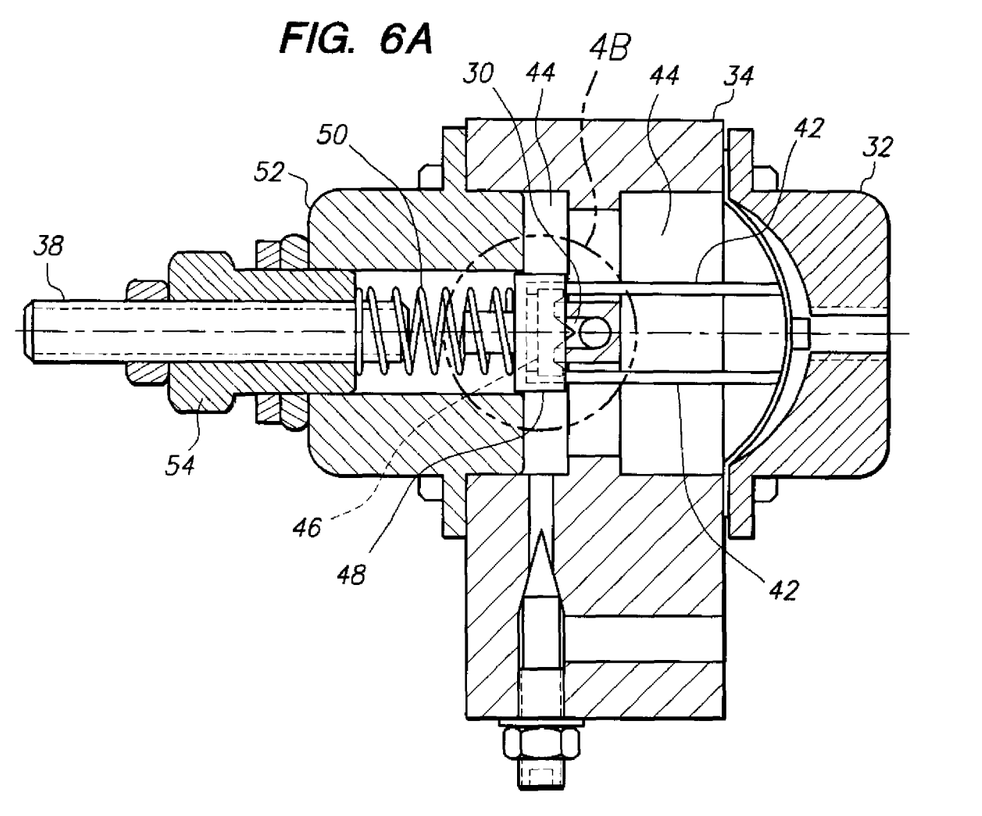
FIG. 6A is a cross sectional view of one stage within the valve shown in FIG. 1.

Referring now to FIG. 5, an exploded view of the flow regulator valve 10 is shown. The second stage 24 may comprise a cap 32 that is mountable to a body 34 with screws 35. A flexible diaphragm 36 may be disposed between the body 34 and the cap 32. The cap 32 which has a chamber 37 and the diaphragm 36 provides a volume to sense the turbo boost pressure 16 via turbo boost pressure inlet 40. The turbo boost pressure 16 is connected to the turbo boost pressure inlet 40. As the turbo boost pressure 16 increases or decreases, the turbo boost pressure 16 pushes upon the diaphragm 36 which displaces the forks 42. As shown in FIG. 6A, the forks 42 protrude through the chamber 44. A disc 46 is disposed between the forks 42. Distal ends of the forks 42 retain the disc 46. The disc 46 is seated onto the orifice 30 (see FIGS. 4 and 6A) to shut off propane flow through the second stage 24. To hold the disc 46 in place on the fork 42, a hat shaped retaining cap 48 is threaded onto the forks 42. A spring 50 is mounted to the hat shaped retaining cap 48. A barrel 52 for guiding the spring 50 is placed over the spring 50. An end cap 54 is threaded into the barrel 52 and places the spring 50 in compression to bias the disc 46 toward the orifice 30. The turbo boost pressure 16 acts on one side of the diaphragm 36 to push the disc 46 off of the orifice 30 while the spring 50 biases the disc 46 toward the orifice 30 to shut off propane flow through the orifice 30. The balance between the boost pressure 16 and spring force of the spring 50 determines the orifice's opening size. The end cap 54 may be threaded into or out of the barrel 52 to regulate the amount of biasing force that the spring 50 places on the disc 46 toward the orifice 30.

Figure 6B:
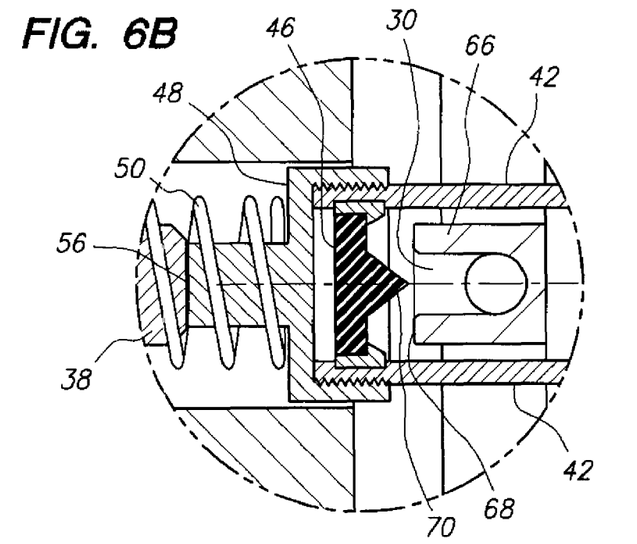
FIG. 6B is an enlarged view of FIG. 6A.

As the turbo boost pressure 16 increases, the force that the boost pressure places on the diaphragm 36 overcomes the spring force 50. The size of the orifice 30 is limited to a maximum amount when the benefits of adding propane to the air inlet 12 are less than the cost of propane. A maximum orifice opening may be regulated by a screw 38 threaded through the end cap 54 which contacts a distal end 56 of the retaining cap 48 as shown in FIG. 6B. The maximum orifice opening may be set at a point where the benefit of engine performance is less than the cost of propane.

The third stage 26 may be identical to the second stage 24. Alternatively, as shown in FIG. 5, the third stage 26 may be substantially similar to the second stage 24 except for the absence of the end screw 38 to regulate the maximum amount of propane flow by controlling the orifice size of the third stage 26.

Figure 3:
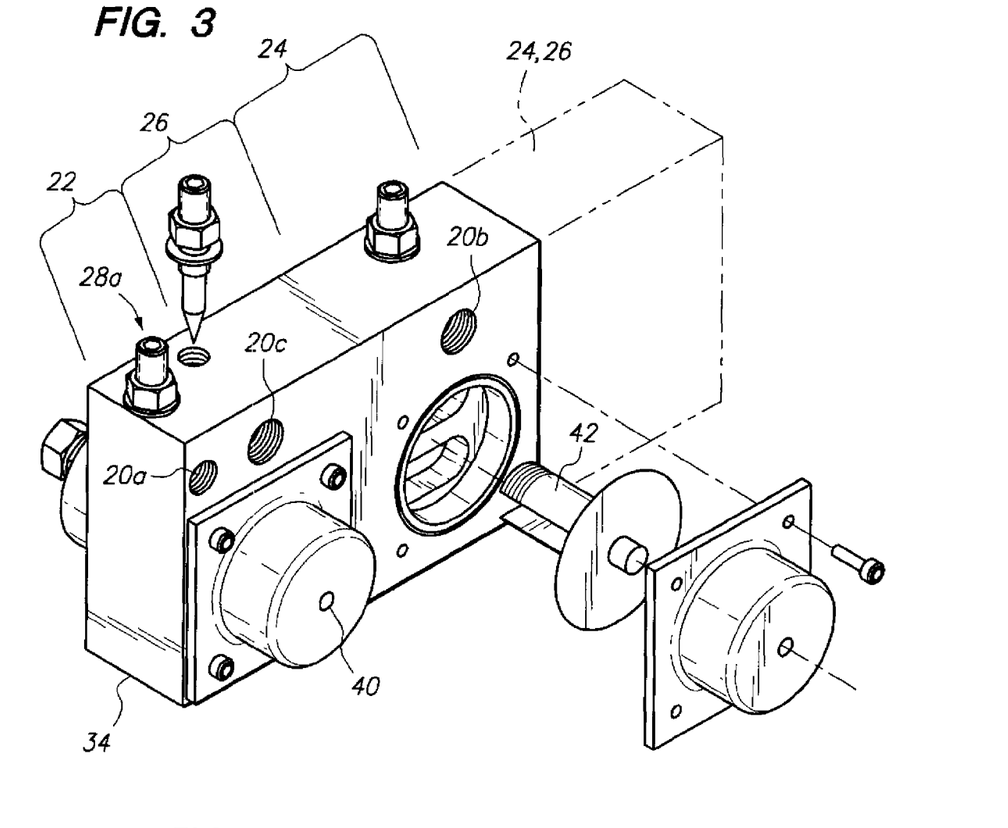
FIG. 3 is a bottom perspective view of the valve shown in FIG. 1.

Although the above description of the flow regulator valve 10 discloses an idle stage or first stage 22, second and third stages 24 and 26, it is contemplated that additional stages working substantially similar to the second or third stages 24, 26 may be added to the flow regulator valve 10 such that the flow regulator valve 10 has an idle stage plus a plurality of second stages 24, third stages 26, or combinations thereof, as shown in FIG. 3. Additionally, it is also contemplated that the flow regulator valve 10 may have a plurality of second stages 24, a plurality of third stages 26 or a plurality of second and third stages 24, 26. These alternative embodiments may exclude the idle stage or first stage 22.

Referring now back to FIG. 2, the flow regulator valve 10 may be disposed between the propane tank 60 and an air inlet 12 of the turbo charger 14. The pressure supplied to the flow regulator valve 10 may be held at a constant pressure via a propane gas pressure regulator 62*a*.

Figure 7:
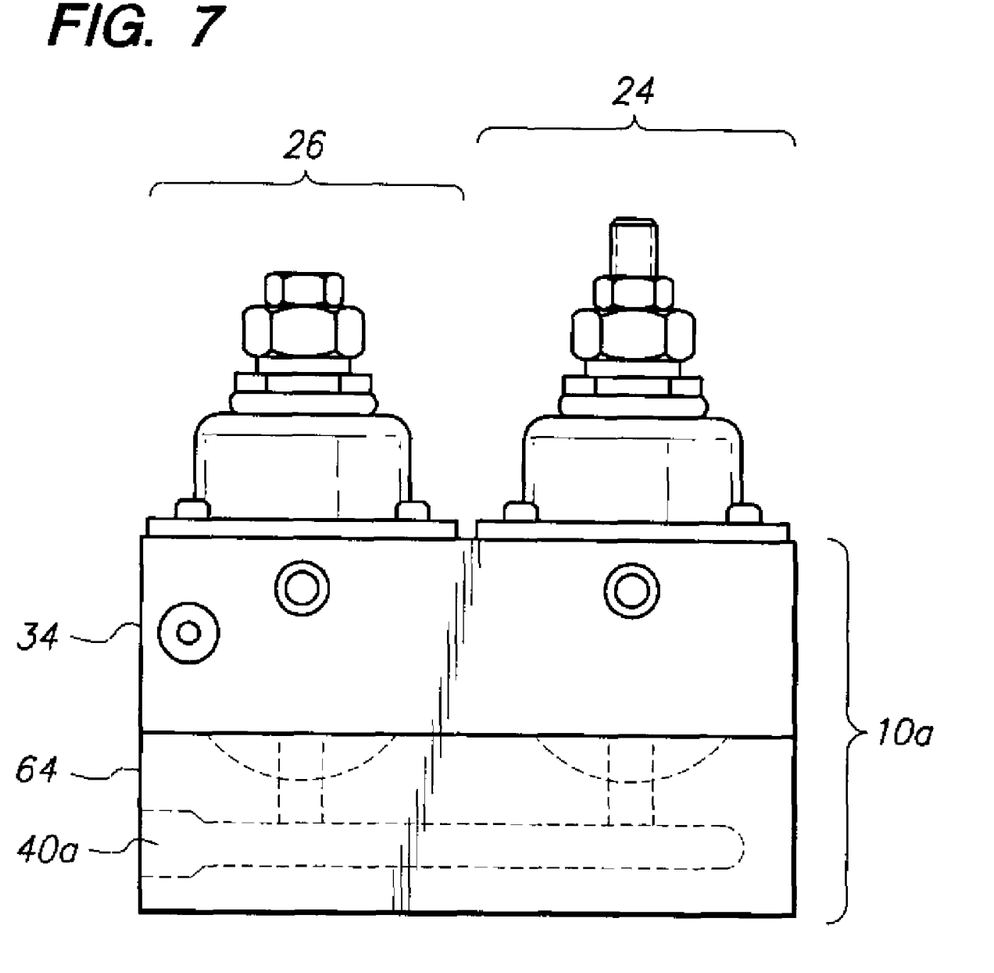
FIG. 7 is an alternative embodiment wherein a single boost line is connected to a manifold for providing the boost pressure to second and third stages of the valve shown in FIG. 1.

Referring now to FIG. 7, an alternative embodiment of the flow regulator valve 10 is shown. In particular, the flow regulator valve 10*a* eliminates the caps 32 discussed above which require one boost pressure line for each of the second and third stages 24, 26 for proper working of the flow regulator valve 10. In the flow regulator valve 10*a* shown in FIG. 7, a manifold 64 is attached to the bottom side of the body 34 which routes one boost pressure line to both the second and third stages 24 and 26. The manifold 64 has a single boost pressure inlet 40*a*.

Referring now back to FIG. 6B, the orifice 30 may comprise a tubular structure 66 with a circular end 68. The disc 46 which is seated upon the circular end 68 to close or shut off propane flow through the orifice 30 may have a conical surface 70. The conical surface 70 of the disc 46 may be disposed within the orifice 30, as shown in FIG. 6A. During use, as the boost pressure overcomes the spring force, the disc 46 begins to lift off of the circular end 68. The propane flows between the disc 46 and the tubular structure 66. The conical surface 70 is traversed out of the tubular structure 66. The opening defined by the circular end 68 and the conical surface 70 increases as the disc 46 is traversed further away from the tubular structure 66. The amount of travel by the disc 46 away from the tubular structure or away from the circular end 68 may be limited by screw 38. This sets the maximum amount of propane flow.

Figure 3A:
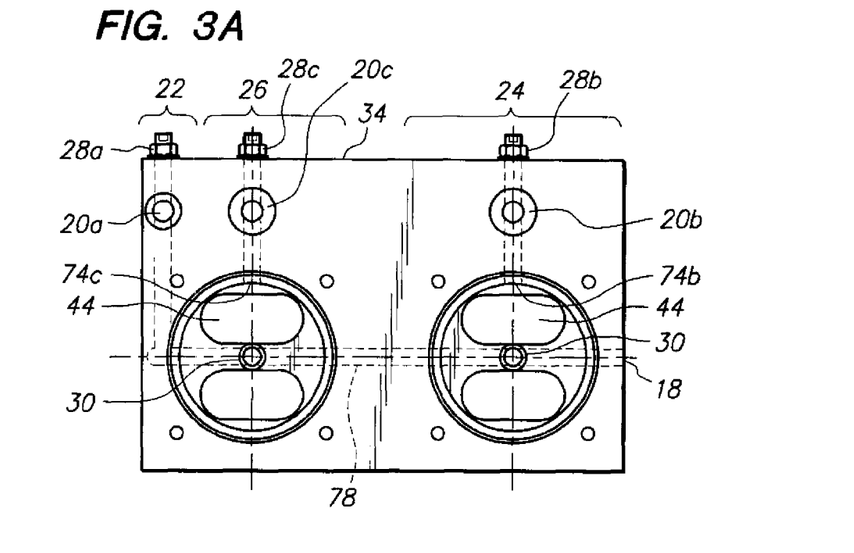
FIG. 3A is a bottom plan view of the valve shown in FIG. 1.

Referring to FIG. 3A, the fluid pathway of the second and third stages 24, 26 may have a needle valve 28*b*, *c* prior to the propane outlets 20 *b*, *c*. These needle valves 28 *b* and *c* may control the maximum amount of propane flow through the second and third stages 24, 26. For example, as discussed above, the screw 38 limits the maximum orifice size 30 by limiting the distance that the disc 46 may be traversed away from the orifice 30. The user may further limit the maximum amount of propane flowing through the second stage 24 by closing down on the needle valve 28*b*. The same is true for the third stage 26. The user may close the needle valve 28*c* to limit the maximum amount of propane flowing through the third stage 26.

The propane flows through the propane inlet 18 (see FIGS. 1 and 3A). The propane flows through the body 34 via conduit 78 (see FIG. 3A) pass the second and third stages 24, 26 and to the first stage 22. The needle valve 28*a* controls the amount of propane flowing through the propane outlet 20*a*. The propane does not flow through the second and third stages 24, 26 when the engine is idling because the discs 46 of the second and third stages 24, 26 are seated upon the circular ends 68 of the orifices 30 of the second and third stages 24, 26. When the boost pressure increases, the second and third stages 24, 26 eventually permit propane to flow through the second and third stages 24, 26 because the force caused by the boost pressure overcomes the spring force to lift the discs 46 off of the circular ends 68 of the orifices 30 as shown in FIG. 6B. At this time, the propane enters the second and third stages 24, 26 as described above and proceeds through aperture 74*b*, *c* (see FIGS. 3A and 4) and out of the propane outlets 20*b*, *c* (see FIG. 3). The needle valves 28*b*, *c* may be used to further limit the maximum amount of propane flowing through the second and third stages 24, 26.

Referring back to FIG. 2, a lock off valve 76 may be connected to the propane tank 60 to shut off flow of propane through the flow regulator valve 10. For example, when the engine is turned off, the driver may traverse the lock off valve 76 to the closed position such that propane does not flow through the system. When the engine is turned on, the driver may traverse the lock off valve 76 to the open position such that propane may flow through the system. A second propane gas regulator 62b may be disposed between the lock off valve 76 and the propane tank 60 for providing propane at a constant pressure.

The above description is given by way of example, and not limitation. Given the above disclosure, one skilled in the art could devise variations that are within the scope and spirit of the invention disclosed herein, including various ways of regulating a maximum amount of propane through the second stage. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A valve for regulating an amount of gaseous fuel injected into an inlet of a turbo charger of an engine based on a boost pressure from the turbo charger, the valve comprising:
   a fluid pathway connectable to the inlet of the turbo charger for providing the gaseous fuel to the inlet of the turbo charger;
   a first restrictor connected to the fluid pathway for regulating an amount of gaseous fuel injected into the inlet of the turbo charger when the engine is at idle, the first restrictor settable to a level such that the engine's performance is optimal with respect to emissions and/or fuel efficiency;
   a second restrictor connected to the fluid pathway for regulating an amount of gaseous fuel injected into the inlet of the turbo charger when the engine is at a speed greater than idling speed, the second restrictor having a variable orifice whose size changes based on the boost pressure from the turbo charger for providing varying amounts of gaseous fuel to the inlet of the turbo charger;
   wherein the second restrictor regulates intake of gaseous fuel into the inlet of the turbo charger within a first engine speed range greater than idling speed and the valve further comprises a third restrictor connected to the fluid pathway for regulating the amount of gaseous fuel injected into the inlet of the turbo charger when the engine is within a second engine speed range. the second engine speed range being higher than the first engine speed range.

2. The valve of claim 1 wherein the first restrictor is an adjustable needle valve.

3. The valve of claim 1 wherein the gaseous fuel is propane.

4. The valve of claim 1 wherein the amount of gaseous fuel introduced into the turbo charger inlet is equal to amount of gaseous fuel flowing through the first and second restrictors.

5. The valve of claim 1 wherein the first engine speed range and the second engine speed range has a gap.

\* \* \* \* \*